Oct. 22, 1968  J. ZEMANEK, JR., ET AL  3,406,779
ACOUSTIC WELL LOGGING TOOL
Filed May 29, 1967  2 Sheets-Sheet 1
FIG. 1
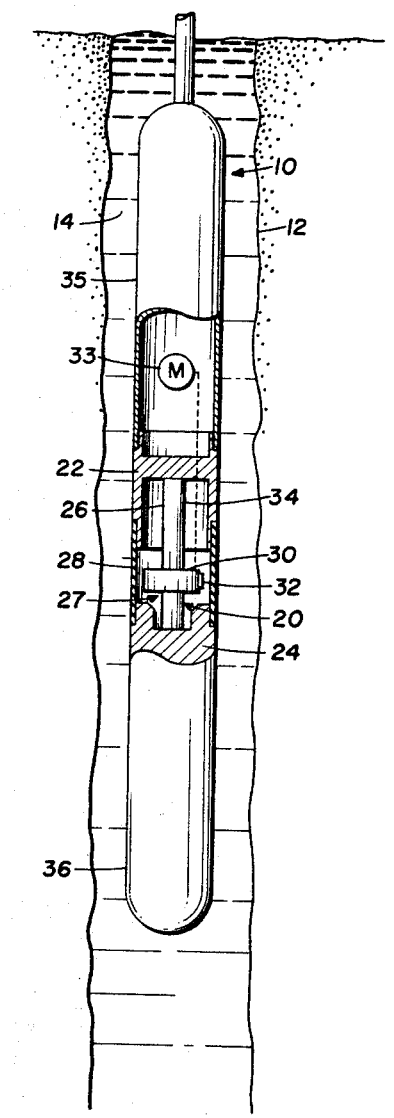
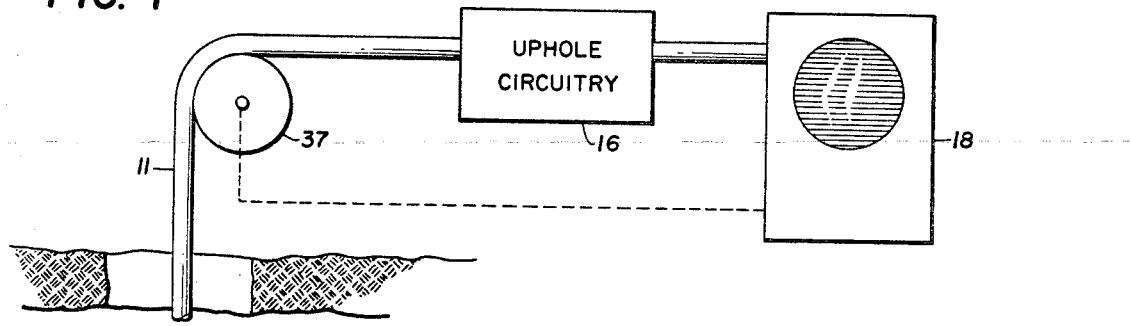
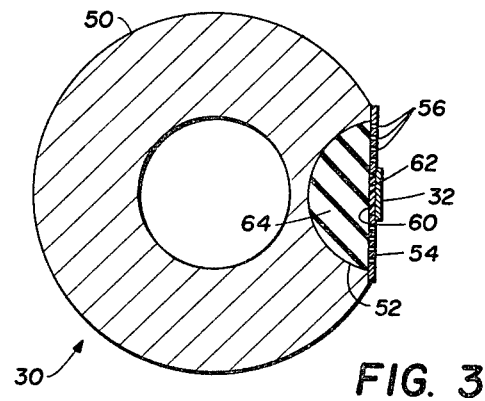
FIG. 3
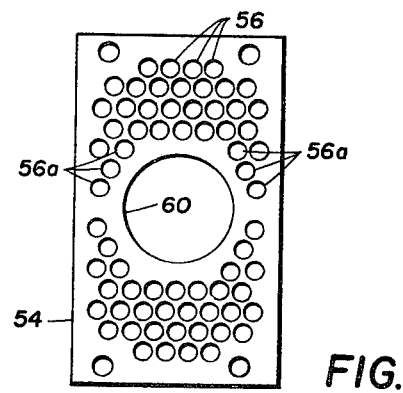
FIG. 4
INVENTORS
JOSEPH ZEMANEK, JR.
ANDREW J. D. STRAUS
ATTORNEY

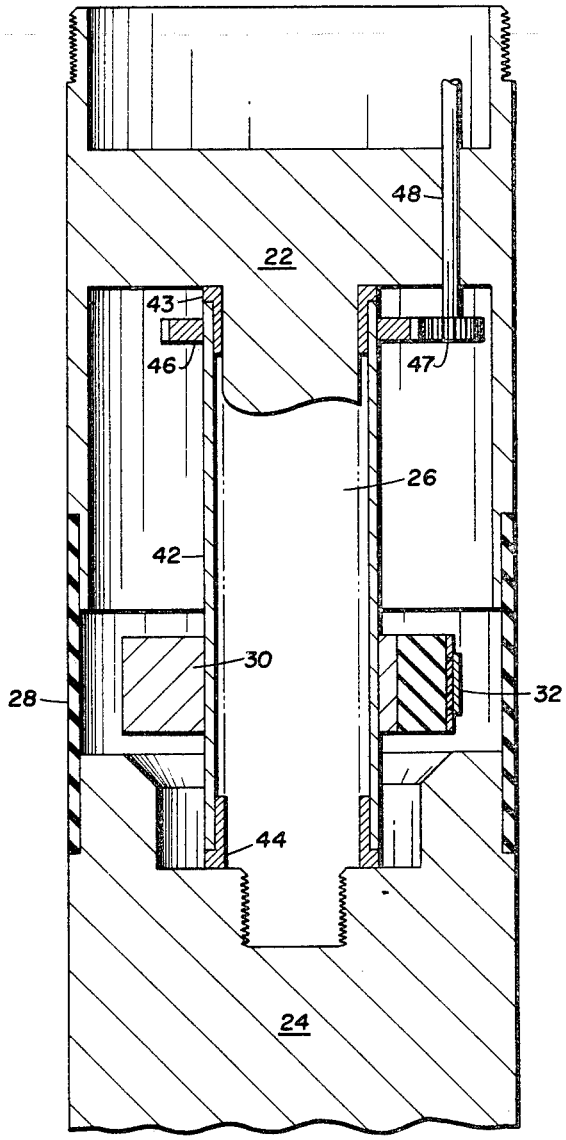

United States Patent Office 3,406,779
Patented Oct. 22, 1968

3,406,779
ACOUSTIC WELL LOGGING TOOL
Joseph Zemanek, Jr., and Andrew J. D. Straus, Dallas, Tex., assignors to Mobil Oil Corporation, a corporation of New York
Filed May 29, 1967, Ser. No. 641,987
14 Claims. (Cl. 181—.5)

ABSTRACT OF THE DISCLOSURE

This specification discloses an acoustic well logging tool having a transceiver firmly mounted therein in a manner provided for low noise level. The tool comprises a support for the transceiver. The transceiver is mounted on the support through a plate member having a plurality of chambers which are staggered in order to present intorsional paths through the plate between the transceiver and the body portion of the support.

*Background of the invention—Field of the invention*

This invention relates to acoustic well logging and more particularly to acoustic well logging methods and systems in which an acoustic transducer is utilized both for the transmission and reception of acoustic energy.

*Description of the prior art*

It is a conventional practice to survey a well or the subterranean formations penetrated thereby by acoustic logging techniques in which acoustic signals, normally at frequencies predominantly in the ultrasonic range, are generated and received by a logging tool run through the well. One acoustic logging technique involves the generation and reception of acoustic signals and the determination of the travel time of such signals between the transmitting and receiving transducers. By this technique, the velocity of sound through a given stratum may be determined in order to gain information regarding the lithology of the stratum. Another technique involves the generation and reception of directional acoustic energy, usually in a rotational mode, in order to obtain an indication of the configuration of the well and/or the presence or absence of anomalies in the wall of the well or within the adjacent formations.

When utilizing separate directional transducers for the transmission and reception of acoustic energy it becomes necessary for best results to focus the transducers with regard to the subterranean interface under investigation. For example, in the acoustic logging of a well in order to determine the presence or absence of anomalies in the wall thereof, it is desirable to incline the transmitter and receiver toward one another in order that their respective directional transmission and reception paths meet on the wall of the well. While this presents no problem when logging in a well of a known uniform diameter, in actual practice the well diameter may vary considerably throughout the extent which is to be logged. For example, should the well penetrate formations of loosely consolidated sand, the wall may slough off somewhat thus increasing the well diameter within these sections. In circumstances such as described above it will be recognized that the use of separate transmitting and receiving transducers oriented at a fixed focal distance may produce unacceptable results.

In order to avoid the disadvantages inherent in the use of separate transmitting and receiving transducers it has heretofore been proposed to utilize a single transducer, commonly termed a transceiver, for both transmission and reception of acoustic energy. The transceiver is oriented within the well such that its directional transmission path is normal to the wall of the well. Since the transmitted acoustic energy strikes the wall of the well at an angle of incidence of zero or near zero, the reflected energy will travel along the same general path as the transmitted energy, thus enabling a single logging run to be made in wells of widely varying diameter. Thus, it will be recognized that when utilizing a logging tool employing an acoustic transceiver as described above, the system requires no focusing changes to accommodate wells of widely varying diameters.

One problem encountered in logging with transceivers, as well as in logging with separate transmitting and receiving transducers, is a high level of background "noise" which often is picked up by the transceiver or receiving transducer and tends to mask the received survey signal. This noise is due predominantly to the transmission of acoustic energy into the logging tool itself and often is accentuated because of the design of the tool. In this regard, it normally is desirable to construct well logging tools of rugged, high-strength materials because of the extreme pressure and temperature conditions which may be encountered in wells. Also, it is most desirable to provide protective shielding around the relatively fragile acoustic elements and the attendant circuitry in order to protect them from impact injury. Unfortunately, the structurally rigid materials such as steel, aluminum, etc., which normally are utilized in forming the structural frame of a logging tool afford good transmission paths for acoustic energy and accordingly contribute materially to the noise in the logging tool.

*Summary of the invention*

In accordance with the present invention, there is provided an acoustic well logging tool of the transceiver type in which acoustic noise is maintained at an acceptably low level and in which the transceiver is firmly mounted at the desired orientation in the tool. The logging tool includes a transceiver support mounted therein, which support comprises a body portion with a chamber formed therein and a plate member connected to the body portion and bridging the chamber. An acoustic transceiver is mounted on the plate over the chamber. A plurality of additional chambers are formed in the plate member between the transceiver and the body portion. These latter chambers are staggered in order to present a plurality of intorsional paths through the plate member between the transceiver and the body portion. In a preferred embodiment of the invention, the plate member has an aperture therein underlying the transceiver and the chamber within the body member is filled with a solid acoustic attenuating material.

*Brief description of the drawings*

FIGURE 1 is a schematic illustration, partly in section, of an acoustic logging system including a logging tool embodying the present invention;
FIGURE 2 is an illustration, partly in section, showing in detail a portion of the tool shown in FIGURE 1;
FIGURE 3 is a sectional view of the transceiver support shown in FIGURE 2; and
FIGURE 4 is a plan view of the plate member forming part of the transceiver support.

*Description of specific embodiments*

With reference to FIGURE 1, there is illustrated schematically an acoustic logging system embodying the improved logging tool of the present invention. The system includes an elongated logging tool 10 which is shown as extended from a cable 11 within a well 12. The well 12 is filled with a fluid, such as drilling mud, indicated by reference numeral 14. The logging system also includes remote circuitry 16 at the surface and a suitable display means such as a cathode ray oscilloscope 18 upon which a facsimile of the wall of the well may be displayed.

The logging tool includes a support structure 20 which comprises upper and lower panels 22 and 24, respectively, and a reduced connecting member 26 extending between the panels. The panels 22 and 24 define a transceiver compartment 27 in the tool within which an acoustic transceiver 32 is mounted. The transceiver compartment is provided with a peripheral window 28 which is relatively transparent to acoustic energy. The window 28 may be formed of a suitable material which desirably has an acoustic impedance close to the impedance of the well fluid 14. The transceiver compartment also is filled with a suitable coupling liquid which prevents the window from collapsing under the hydrostatic head of the well fluid and which desirably has an acoustic impedance close to that of the well fluid 14 and the window 28. By way of example, window 28 may be formed of a .05″ thick Hycar rubber sleeve and the liquid may be a light oil such as SAE 10W motor oil.

A transceiver support 30 is mounted in the compartment 27 for rotational movement about the connecting member 26. The acoustic transceiver 32 is firmly mounted on the support 30 as described in greater detail hereinafter. The transceiver 32 is a directional electroacoustic transducer which is oriented such that its directional transmission path extends laterally from the tool normal to the axis of rotation of support 30. By way of example, the transceiver 32 may be a piezoelectric crystal of lead zirconate titanate having a resonant frequency within the range of one to two megahertz.

The logging tool also is provided with a prime mover such as electric motor 33. A drive mechanism indicated by broken line 34 interconnects the prime mover and the transceiver support 30 so that the transceiver 32 may be rotated throughout a 360° scan of the well. The upper and lower sections 35 and 36, respectively, of the logging tool may be provided with suitable centralizing means (not shown) for positioning the tool concentrically within the well.

It will be recognized that the transceiver 32 is protected from impact and injury as might occur during movement of the tool 10 through the well. The upper and lower sections 35 and 36 shield the transceiver from possible longitudinal contact with obstructions in the well and the recessed location of the transceiver within the compartment 27 greatly reduces the possibility of lateral impact. Thus, it can be seen that the logging tool 10 provides structural protection for the transceiver element 32.

In operation of the system illustrated in FIGURE 1, the logging tool is lowered into the well and the prime mover 33 is energized to rotate the transducer support 30 about the connecting member 26. The transceiver 32 is excited to generate pulses of acoustic energy which travel outwardly predominantly in a confined, narrow beam path normal to the wall of the well 12. For example, the transceiver may directionally transmit and receive an acoustic signal having a predominant frequency within the rang of one to two megahertz. The transceiver may be rotated at 100 to 400 revolutions per minute and the signal pulses may be transmitted at repetition frequency on the order of 2,000 times per second. A portion of the transmitted acoustic energy is reflected from the wall of the well and is detected by the transceiver and converted into representative signals such as electric pulses. These signals then are transmitted to the surface by suitable communication channels in the cable 11 where they are received at the surface by the remote circuitry 16 which functions in response to the signals to intensity modulate the beam of the cathode ray oscilloscope 18. The logging tool also is provided with position indicating means (not shown) which functions to transmit a position signal to the surface which is representative of the angular position of the transceiver within the well. This position signal operates to horizontally sweep the oscilloscope beam across the face of the oscilloscope in proportion to the angular position of the transceiver within the well. As the logging tool 10 is moved upwardly through the well, a depth indicating means such as measuring sheave 37 which is rotated by the cable 11 generates a depth signal which functions to control the sweep of the oscilloscope beam vertically across the face of the oscilloscope.

From the foregoing description, it will be recognized that as the logging tool is moved upwardly or downwardly through the well and the transceiver 32 rotated throughout a 360° scan, a display is produced on the face of the oscilloscope which is correlated with the depth of the logging tool within the well. Whenever the beam of acoustic pulses generated by the transceiver 32 encounters an anomaly such as a fracture in the wall of the well, the acoustic energy is not reflected directly back to the transceiver. When a pulse is not received by the transceiver the remote circuitry does not receive a representative signal to intensity modulate the beam of the oscilloscope and a gap is indicated on the face of the oscilloscope. The oscilloscope face thus presents a display of anomalies found in the wall of the well.

While the acoustic logging system has thus far been described with regard to surveying the face of the well, it will be recognized that the system may be utilized in surveying the adjacent subterranean formations. For example, the logging system may be utilized to determine the orientation of anomalies in the subterranean formations at locations spaced from the wall of the well. Utilizing the system to log the adjacent formations, it is desirable to utilize a transceiver which directionally transmits and receives within a lower frequency range than that heretofore described. For example, the transceiver may be one that transmits and receives a directional acoustic signal having a predominant frequency within the range of 50 to 100 kilohertz. In this case it will also be necessary to utilize a lower repetition frequency for pulse transmission and the transceiver itself should be rotated at a lower speed. Thus, the repetition frequency may be 50 pulses per second and the transceiver rotated at one r.p.m.

Turning now to FIGURE 2, there is illustrated an enlarged view of the transceiver compartment 27 of the tool showing in detail the transceiver and transceiver support and the attendant elements of the transceiver assembly. The transceiver support 30 is secured to a cylindrical carriage member 42 which is mounted on bearings 43 and 44 for rotational movement about the connecting member 26. The spur gear 46 is mounted on the carriage member and engages a pinion gear 47 which is mounted on a drive shaft 48. The drive shaft is journalled in the upper panel 22 and is connected to the motor 33 (FIGURE 1) whereby the carriage member, transceiver support, and transceiver are rotated upon energization of the motor.

Upon firing of a transducer, acoustic energy is transmitted directly to the structural element upon which the transducer is supported. This energy travels through the support member in reflected paths and this member acts somewhat like a reverberator with the attendant result that some energy is transferred back to the transducer. In acoustic logging tools in which separate transmitting and receiving transducers are utilized, the energy transmitted to the support structure is of little detrimental effect so long as it is not transmitted through the tool to the receiving transducer. However, in logging tools of the transceiver type, reverberation within the support structure often creates a very high noise level which interferes seriously with the reception of the survey signal.

In accordance with the present invention, the transceiver is coupled to the support structure through means providing a multiplicity of intorsional paths whereby the degree of reverberation within the support structure is greatly lessened thus significantly attenuating the noise received by the transceiver. More particularly and with reference to FIGURE 3, there is shown a sectional view of the transceiver support 30 which illustrates the aforementioned means of coupling the transceiver to the transceiver support. As shown in FIGURE 3, the main or body portion 50 of the transceiver support is provided with a recess which forms a chamber 52. The transceiver support also includes a plate member 54 which bridges the chamber 52 and is connected to the body portion 50 of the support. The plate member preferably is removably secured to the portion 50 by suitable fasteners such as screws (not shown) in order that the transceiver may be conveniently replaced. However, the plate member may be welded to the body portion or may be formed integrally therewith. The transceiver 32 is secured to the plate member 54 by any suitable means, such as an epoxy resin bond, and is positioned such that the chamber 52 is behind the transceiver.

The member 54 is provided with a multiplicity of chambers 56 therein which are located between the transceiver 32 and the contact of the plate member with the body portion 50. As shown in FIGURE 4, these chambers are staggered with respect to one another so that a plurality of intorsional paths are provided through the plate member between the transceiver and the body portion of support 30. The staggered arrangement of the chambers 56 greatly increases the paths in member 54 over which the acoustic energy travels in order to reach the body portion 50 with the attendant result that acoustic energy which is transmitted to the body portion is highly attenuated because of the lengthy transmission paths. In addition, the walls of the chambers 56 provide a plurality of reflective interfaces which cause the transmitted energy to be reflected and scattered along numerous paths, some of which oppose one another. Thus, the energy which is transmitted through the plate member 54 tends to impose a self-cancelling effect which further reduces the level of energy which actually reaches the body portion of the transceiver support. Accordingly, reverberation within the body portion of the transceiver support is greatly lessened resulting in a reduced noise level in the transceiver 32.

From an examination of FIGURE 4, it can be seen that some energy from the transceiver 32 will be reflected immediately back thereto from the next adjacent chambers, such as those indicated by reference numeral 56a. However, these chambers may be located in relatively close proximity to the transceiver, preferably within a distance of not more than one-fourth inch and, more desirably within a distance of not more than one-sixteenth inch, from the transceiver, so that the relatively small amount of energy which is reflected directly back to the transceiver through the plate member 54 reaches the transceiver well ahead of the survey signal reflected from the interface under investigation.

Acoustic energy which is transmitted through the plate member 54 to the body portion 50 will travel through the body portion and ultimately back to the plate member. The chambers 56 again present a plurality of intorsional paths in the member 54 which the acoustic energy follows in traveling through the plate member from the body portion of the support to the transceiver 32. Thus, such energy undergoes further attenuation as it is transmitted through the plate member to the transceiver.

It is preferred that the chambers 56 take the form of apertures extending through the plate member 54, as best shown in FIGURE 3. However, these chambers may be provided by other suitable means. For example, they may take the form of recesses which extend only partially through the plate member alternately from the top and bottom surfaces of the plate member.

The provision of the chambers 56 in the plate member acoustically isolates the transceiver 32 from the body portion 50 to a relatively high degree. In order to further enhance the acoustic isolation of the transceiver with respect to the body portion of the support, it is preferred to provide the plate member 54 with an aperture 60 therein underlying the transceiver. This aperture is only slightly smaller than the transceiver 32 in order that a relatively small area of direct contact is provided between the transceiver 32 and the structural material forming the plate member 54. By way of example, for a transceiver crystal in the form of a one-half inch diameter disc the aperture 60 may be of a diameter of three-eighths of an inch. Where the transceiver is secured to the plate member by means of a bonding material such as epoxy resin, the bonding material may fill the aperture 60 behind the transceiver as indicated by reference numeral 62.

In a further aspect of the invention, the chamber 52 is filled with a relatively solid acoustic attenuating material 64 which preferably has a low compressibility so that it will not undergo significant compression at the pressures encountered in the well. The attenuating material 64 may be a substance such as Teflon. However, it is preferred that the chamber 52, and also the aperture 60 if it is not filled with a substance such as the bonding material 62, be filled with an elastomeric material such as natural or synthetic rubber, e.g., neoprene, and that the material be placed under a compressive stress. In this regard, through tests of the invention, it has been found that the signal-to-noise ratio can be increased substantially by placing material 64 under a fixed compressive stress. If desired, the chambers 56 also may be filled with an acoustic attenuating material such as neoprene in order to exclude the coupling liquid therefrom. However, this usually will be unnecessary and the chambers 56 may be left empty.

From the foregoing description it will be recognized that the present invention provides a logging tool in which the transceiver may be firmly mounted so that it is not easily shifted from its desired orientation. The plate member and body portion may be formed of structurally rigid materials such as steel, aluminum, brass, or lead in order to provide a firm support for the transceiver which will sustain the rigors of field use. Yet the noise level in the transceiver can be kept at an acceptably low level, such that satisfactory survey results may be obtained.

Having described specific embodiments of the instant invention, it will be understood that further modifications thereof may be suggested to those skilled in the art, and it is intended to cover all such modifications as fall within the scope of the appended claims.

What is claimed is:

1. In an acoustic logging tool adapted to be moved longitudinally through a well, the combination comprising:
   a transceiver support mounted in said tool, said support comprising a body portion having a chamber formed therein and a plate member connected to said body member and bridging said chamber;
   an acoustic transceiver mounted on said plate member for transmitting acoustic energy away from said support and receiving reflected energy; and
   a plurality of chambers formed in said plate member between said transceiver and said body portion, said chambers being staggered to present a plurality of intorsional paths through said plate member between said transceiver and said body portion.

2. The combination of claim 1 wherein the chamber within said body portion is filled with a solid acoustic attenuating material.

3. The combination of claim 2 wherein said acoustic attenuating material is an elastomeric material under a compressive stress.

4. The combination of claim 1 wherein said plate member has an aperture therein underlying said transceiver.

5. The combination of claim 1 wherein the chambers within said plate member are formed by apertures extending through said plate member.

6. The combination of claim 1 wherein a portion of said plurality of chambers within said plate member are spaced from said transceiver by a distance of not more than one-fourth inch.

7. The combination of claim 1 wherein a portion of said plurality of chambers within said plate member are spaced from said transceiver by a distance of not more than one-sixteenth inch.

8. In an acoustic well logging tool adapted to be moved longitudinally through a well, the combination comprising:
   a support structure in said tool including longitudinally spaced panel members and a reduced connecting member extending between said panel members, said panel members defining a transceiver compartment in said tool;
   an annular shaped transceiver support mounted in said compartment for rotation about said connecting member, said transceiver support comprising a body portion having a chamber formed therein and a plate member in said transceiver support connected to said body member and bridging said chamber;
   an acoustic transceiver mounted on said plate member for transmitting acoustic energy away from said support and receiving reflected energy; and
   a plurality of chambers formed in said plate member between said transceiver and said body portion, said chambers being staggered to present a plurality of intorsional paths through said plate member between said transceiver and said body portion.

9. The combination of claim 8 wherein the chamber within said body portion is filled with a solid acoustic attenuating material.

10. The combination of claim 9 wherein said acoustic attenuating material is an elastomeric material under a compressive stress.

11. The combination of claim 10 wherein said plate member has an aperture therein underlying said transceiver.

12. The combination of claim 11 wherein the chambers within said plate member are formed by apertures extending through said plate member.

13. The combination of claim 12 wherein a portion of said plurality of chambers within said plate member are spaced from said transceiver by a distance of not more than one-sixteenth inch.

14. The combination of claim 12 wherein a portion of said plurality of chambers within said plate member are spaced from said transceiver by a distance of not more than one-fourth inch.

References Cited
UNITED STATES PATENTS

| | | | |
|---|---|---|---|
| 2,631,270 | 3/1953 | Goble | 181—.5 |
| 3,051,927 | 8/1962 | Mazzagatti | 340—17 |
| 3,102,604 | 9/1963 | Engle | 181—.5 |
| 3,144,090 | 8/1964 | Mazzagatti et al. | 181—.5 |
| 3,190,388 | 6/1965 | Moser et al. | 181—.5 |

SAMUEL FEINBERG, *Primary Examiner.*